US012771956B2

(12) United States Patent
Watanabe

(10) Patent No.: US 12,771,956 B2
(45) Date of Patent: Oct. 20, 2026

(54) IMAGE SENSOR AND DATA STRUCTURE

(71) Applicant: Sony Semiconductor Solutions Corporation, Kanagawa (JP)

(72) Inventor: Goshi Watanabe, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 244 days.

(21) Appl. No.: 18/837,029

(22) PCT Filed: Mar. 13, 2023

(86) PCT No.: PCT/JP2023/009618
§ 371 (c)(1),
(2) Date: Feb. 27, 2025

(87) PCT Pub. No.: WO2023/182049
PCT Pub. Date: Sep. 28, 2023

(65) Prior Publication Data

US 2025/0386112 A1 Dec. 18, 2025

(30) Foreign Application Priority Data

Mar. 23, 2022 (JP) ................................ 2022-046463

(51) Int. Cl.
*H04N 25/47* (2023.01)
*G06N 20/00* (2019.01)
*H04N 25/617* (2023.01)

(52) U.S. Cl.
CPC ............ *H04N 25/47* (2023.01); *G06N 20/00* (2019.01); *H04N 25/617* (2023.01)

(58) Field of Classification Search
None
See application file for complete search history.

(56) References Cited

U.S. PATENT DOCUMENTS 9,245,314 B2 * 1/2016 Jannard ................. G06T 3/4015
2012/0303619 A1 * 11/2012 Fisera .................... G01D 4/002 707/E17.046
2017/0200458 A1 * 7/2017 Kang ...................... G10L 15/02
(Continued)

FOREIGN PATENT DOCUMENTS

EP 4415380 A1 8/2024
JP 2017531865 A 10/2017
(Continued)

OTHER PUBLICATIONS

International Search Report (PCT/ISA/210), International Application No. PCT/JP2023/009618, dated May 23, 2023.

*Primary Examiner* — James M Hannett
(74) *Attorney, Agent, or Firm* — Michael Best & Friedrich LLP

(57) ABSTRACT

An image sensor includes: a pixel array unit in which pixels are two-dimensionally arranged, the pixels detecting a change in light reception amount as an event and generating an event signal indicating a detection result of the event; a predetermined processing unit configured to execute predetermined processing accompanied by generation of electromagnetic noise; and an information output unit configured to generate and output noise source driving presence/absence data indicating whether or not the predetermined processing is executed when the event is detected.

12 Claims, 17 Drawing Sheets

(56) References Cited

U.S. PATENT DOCUMENTS

| | | | | |
|---|---|---|---|---|
| 2020/0312899 | A1 | 10/2020 | Seo | |
| 2021/0006755 | A1 | 1/2021 | Kim | |
| 2021/0103017 | A1 * | 4/2021 | Dyvorne | A61B 5/055 |
| 2023/0156375 | A1 | 5/2023 | Kazuyuki | |
| 2024/0323548 | A1 * | 9/2024 | Sun | G06N 3/0464 |
| 2024/0324987 | A1 * | 10/2024 | Hagiwara | A61B 8/12 |

FOREIGN PATENT DOCUMENTS

| | | | |
|---|---|---|---|
| WO | 2018051809 | A1 | 3/2018 |
| WO | WO-2021187350 | A1 | 9/2021 |
| WO | 2021241120 | A1 | 12/2021 |

* cited by examiner

FIG. 5

| AREA ID | 1 | 2 | 3 | 4 | 5 | 6 | 7 | 8 | 9 |
|---|---|---|---|---|---|---|---|---|---|
| NUMBER OF NOISE EVENTS | 10 | 3 | 5 | 8 | 41 | 20 | 18 | 3 | 4 |

FIG. 7

| DATA ADDRESS | PAYLOAD | MEANING |
|---|---|---|
| 1 | 10 | NUMBER OF NOISE EVENTS OCCURRING IN AREA Ar1 |
| 2 | 50 | NUMBER OF NOISE EVENTS OCCURRING IN AREA Ar2 |
| 3 | 8 | NUMBER OF NOISE EVENTS OCCURRING IN AREA Ar3 |

FIG. 8

| DATA ADDRESS | PAYLOAD | MEANING |
|---|---|---|
| 1 | 3 | NUMBER OF AREA DIVISIONS |
| 2 | 0 | x COORDINATE OF Ar1 |
| 3 | 0 | y COORDINATE OF Ar1 |
| 4 | 120 | Width OF Ar1 |
| 5 | 480 | Height OF Ar1 |
| 6 | 10 | NUMBER OF NOISE EVENTS OCCURRING IN AREA Ar1 |
| 7 | 120 | x COORDINATE OF Ar2 |
| 8 | 0 | y Coordinate OF Ar2 |
| 9 | 480 | Width OF Ar2 |
| 10 | 480 | Height OF Ar2 |
| 11 | 50 | NUMBER OF NOISE EVENTS OCCURRING IN AREA Ar2 |
| 12 | 600 | x COORDINATE OF Ar3 |
| 13 | 0 | y Coordinate OF Ar3 |
| 14 | 120 | Width OF Ar3 |
| 15 | 480 | Height OF Ar3 |
| 16 | 8 | NUMBER OF NOISE EVENTS OCCURRING IN AREA Ar3 |

FIG. 16

| AREA ID | 1 | 2 | 3 | 4 | 5 | 6 | 7 | 8 | 9 | TOTAL |
|---|---|---|---|---|---|---|---|---|---|---|
| NUMBER OF NOISE EVENTS | 10 | 3 | 5 | 8 | 41 | 20 | 18 | 3 | 4 | 112 |

FIG. 17

| AREA ID | 1 | 2 | 3 | 4 | 5 | 6 | 7 | 8 | 9 | TOTAL |
|---|---|---|---|---|---|---|---|---|---|---|
| NUMBER OF NOISE EVENTS | 10 | 3 | 5 | 8 | 41 | 20 | 18 | 3 | 4 | 112 |
| DIFFERENCE FROM PREVIOUS FRAME | +4 | −4 | −2 | +1 | −10 | +4 | −3 | −4 | −2 | −16 |
| INTEGRATION OF PAST TWO FRAMES | 16 | 10 | 12 | 15 | 92 | 36 | 39 | 10 | 10 | 240 |

IMAGE SENSOR AND DATA STRUCTURE

TECHNICAL FIELD

The present technology relates to a technology of a data structure used in an event-driven image sensor and a signal processing device.

BACKGROUND ART

The performance of an image sensor has been improved, and for example, an image sensor having a stacked structure in which not only a pixel array unit but also a chip as an arithmetic processing unit is mounted has been developed.

In such an image sensor, as disclosed in Patent Document 1 below, processing of a digital signal processor (DSP) (for example, recognition processing using machine learning) and processing of reading charge from the pixel array unit may be partially executed in parallel.

CITATION LIST

Patent Document

Patent Document 1: WO 2018/051809 A

SUMMARY OF THE INVENTION

Problems to be Solved by the Invention

However, since electromagnetic noise is generated during execution of processing by the DSP, an error may be included in the amount of the charge read from a pixel.

The present technology has been made in view of such a problem, and an object of the present technology is to provide an environment in which processing in the subsequent stage can be appropriately executed in consideration of the influence of the electromagnetic noise.

Solutions to Problems

According to the present technology, there is provided an image sensor including: a pixel array unit in which pixels are two-dimensionally arranged, the pixels detecting a change in light reception amount as an event and generating an event signal indicating a detection result of the event; a predetermined processing unit configured to execute predetermined processing accompanied by generation of electromagnetic noise; and an information output unit configured to generate and output noise source driving presence/absence data indicating whether or not the predetermined processing is executed when the event is detected.

There is a possibility that the event occurring during the execution of the predetermined processing of generating the electromagnetic noise is an event erroneously detected due to the electromagnetic noise.

In the case of a normal pixel array unit in which RGB pixels are two-dimensionally arranged, since the reading processing is performed on all the pixels, the position of each of the pixels read during execution of the predetermined processing can be estimated on the basis of a reading timing. However, in an EVS in which the reading processing is performed only on the pixel in which the change in light reception amount occurs, since the reading timing for the event signal is undefined, the position of the pixel from which the event signal is output cannot be estimated on the basis of the reading timing.

Therefore, by generating the noise source driving presence/absence data indicating whether or not the event signal is generated during the execution of the predetermined processing as the noise source, it is possible to estimate the possibility that the event is erroneously detected due to the electromagnetic noise.

According to the present technology, there is provided a data structure used in a signal processing device that includes a pixel array unit in which pixels are two-dimensionally arranged, the pixels detecting a change in light reception amount as an event and generating an event signal indicating a detection result of the event, and a predetermined processing unit configured to execute predetermined processing accompanied by generation of electromagnetic noise, the signal processing device performing signal processing using the event signal obtained in an image sensor configured to generate noise source driving presence/absence data indicating whether or not the predetermined processing is executed when the event is detected, the data structure including the event signal and the noise source driving presence/absence data, and being used by the signal processing device to perform correspondence processing using the event signal and adjust the correspondence processing on the basis of the noise source driving presence/absence data.

BRIEF DESCRIPTION OF DRAWINGS

FIG. 5 is a diagram illustrating an example of statistical information stored in a payload area of minimum unit data.

FIG. 7 is a diagram illustrating a specific example of statistical information stored in a payload area of minimum unit data.

FIG. 8 is a diagram illustrating another specific example of statistical information stored in a payload area of minimum unit data.

FIG. 16 is a diagram illustrating a modification example of statistical information stored in a payload area of minimum unit data.

FIG. 17 is a diagram illustrating another modification example of statistical information stored in a payload area of minimum unit data.

MODE FOR CARRYING OUT THE INVENTION

Hereinafter, embodiments according to the present technology will be described in the following order with reference to the accompanying drawings.

<1. Configuration of event-driven image sensor>
<2. Transmission timing of minimum unit data>
<3. Processing flow>
<4. Second embodiment>
<5. Third embodiment>
<6. Modification example>
<7. Summary>
<8. Present technology>

1. Configuration of Event-Driven Image Sensor

In a first embodiment to be described below, information (statistical information) regarding whether or not event data output from an event-driven image sensor 1 is affected by noise is output together with the event data. Thus, a processing unit in the subsequent stage can appropriately use the event data.

In the following description, processing to be a noise source will be referred to as "predetermined processing". Furthermore, the processing in the subsequent stage, which is performed using the event data and the statistical information, will be referred to as "correspondence processing". That is, the correspondence processing is processing that can be more appropriately performed by using statistical information to be described later, the statistical information being information regarding whether or not the event data is affected by noise.

In the following description, the event-driven image sensor 1 will be referred to as an event-based vision sensor (EVS) 1.

Furthermore, the determination as to whether or not the event data is affected by noise is based on information regarding whether or not the event is an event that occurs during the driving of the noise source.

Several noise sources are conceivable, the noise sources generating electromagnetic noise that affects detection of an event. In the present embodiment, a digital signal processor 2 included in the EVS 1 is taken as an example of the noise source. That is, when the digital signal processor 2 executes predetermined processing, electromagnetic noise is generated, and occurrence of an event is detected in the EVS 1 due to the electromagnetic noise.

In the following description, the digital signal processor 2 will be referred to as a digital signal processor (DSP) 2.

The predetermined processing executed by the DSP 2 is, for example, inference processing of inferring what a subject is on the basis of the event data generated in the EVS 1. That is, the electromagnetic noise is generated when the DSP 2 performs the inference processing.

Figure 1:
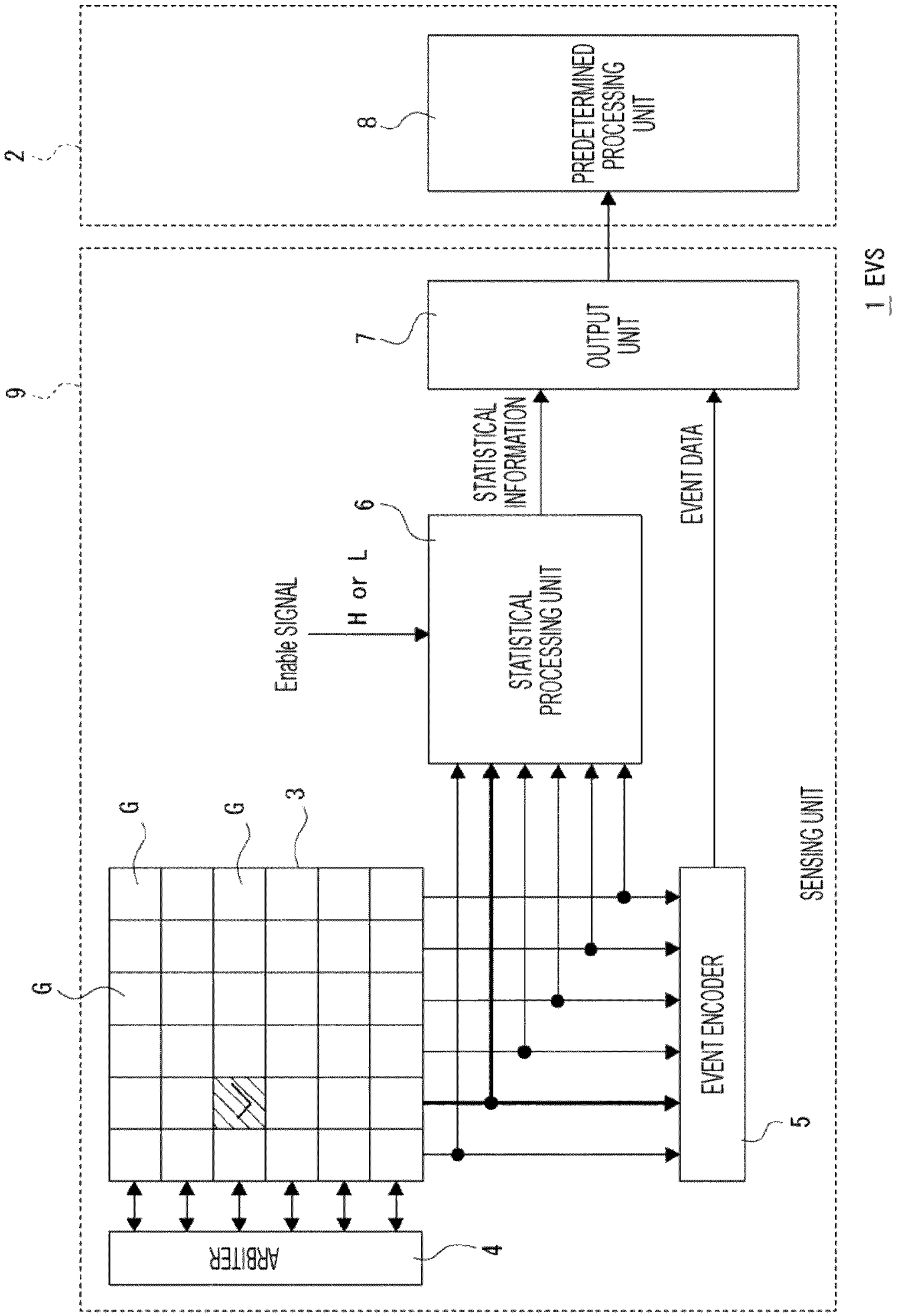
FIG. 1 is a block diagram illustrating a configuration example of EVS.

A configuration of the EVS 1 will be described with reference to FIG. 1.

The EVS 1 includes a pixel array unit 3, an arbiter 4, an event encoder 5, a statistical processing unit 6, an output unit 7, and a predetermined processing unit 8.

The pixel array unit 3 includes pixels G arranged in a two-dimensional lattice. Each of the pixels G includes a photoelectric conversion element (for example, a photodiode) that performs photoelectric conversion based on incident light to generate charge, and an event detection unit that detects an event on the basis of a difference between a reference level and a level of a light reception signal.

The event detection unit can distinguish and detect an ON event in which the light reception amount increases by a certain amount or more and an OFF event in which the light reception amount decreases by a certain amount or more.

The arbiter 4 arbitrates a request from the pixel G in the pixel array unit 3, and outputs an event signal from the pixel G determined on the basis of the arbitration result to the event encoder 5.

In this manner, an event signal is output from the pixel G (hatched pixel G in FIG. 1) where the event is detected to the event encoder 5.

The event encoder 5 generates event data on the basis of the event signal output from the pixel G.

The event data includes at least a type of event (whether it is an ON event or an OFF event), information (x coordinate and y coordinate) for specifying the position of the pixel G where the event occurs, and time stamp information for specifying a time when the event occurs.

The statistical processing unit 6 calculates and outputs statistical information regarding the number of events that occur during driving of the noise source among the occurrence events. In the following description, an event that occurs while the noise source is driven will be referred to as a "noise event". That is, the noise event is an event that may be erroneously detected due to the driving of the noise source.

The statistical processing unit 6 specifies the position (x coordinate, y coordinate) of the pixel G where the event occurs on the basis of the event signal output from the pixel array unit 3. Furthermore, the statistical processing unit 6 specifies an area where an event occurs according to the specified position of the pixel G. The area is obtained by dividing the pixel array unit 3 into a plurality of areas, and each of the areas may have the same size and shape, or may have different sizes and shapes.

Figure 2:
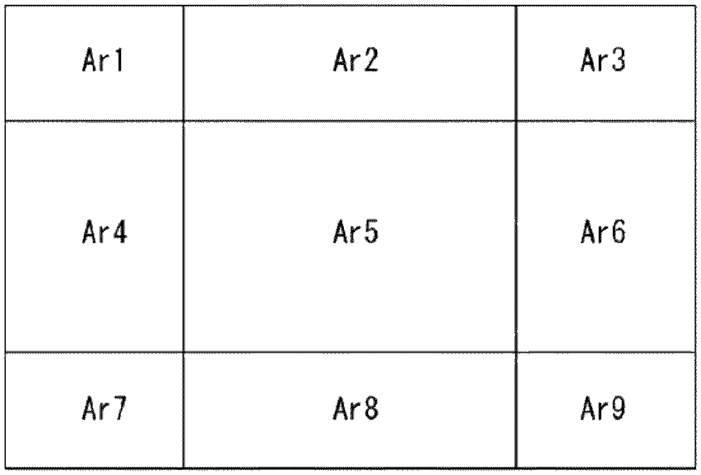
FIG. 2 is a diagram illustrating a division example of a pixel array unit.

FIG. 2 illustrates an example in which the pixel array unit 3 is divided into nine areas Ar (areas Ar1, Ar2, Ar3, Ar4, Ar5, Ar6, Ar7, Ar8, and Ar9).

The statistical processing unit 6 determines whether or not the noise source is being driven at the time of occurrence of the event, and in a case where it is determined that the noise source is being driven, the statistical processing unit 6 adds the information for each divided area Ar as a noise event to generate counting information. For the counting, a noise event counter prepared for each divided area Ar is used.

Furthermore, an Enable signal input to the statistical processing unit 6 is used in processing of determining whether or not the noise source is driven during the occurrence of the event. The Enable signal is a signal that is turned on when the predetermined processing unit 8 as a noise source to be described later is driven and turned off when the predetermined processing unit 8 is not driven.

Here, the reason why the statistical information regarding the noise event detected in the pixel array unit 3 is required will be described.

For example, in a case where the pixel array unit is a pixel array unit including a red (R) pixel, a green (G) pixel, and a blue (B) pixel, pixel signals output from the pixels are read periodically for all the pixels. Then, since the reading timing is determined in advance, when a time zone in which the DSP 2 as a noise source is driven is known, the pixel signal read during the driving of the DSP 2 can be specified later. Therefore, in a case where processing such as noise reduction is performed, it is possible to appropriately determine which pixel signal is subjected to stronger noise reduction.

Note that the intensity change of the noise reduction is, for example, processing of changing the coefficient of a filter to be applied.

On the other hand, in the pixel array unit 3 that outputs the event signal, since the event signal is output for each occurrence of the event, it is difficult to later estimate whether or not the event occurs in a time zone where the DSP 2 as a noise source is driven.

In the present embodiment, the statistical processing unit 6 determines whether or not the DSP 2 is operating every time an event signal is received, and performs statistical processing of counting the event as a noise event in a case where the DSP 2 is operating.

Thus, it is possible to perform appropriate processing according to the number of noise events in the processing in the subsequent stage.

FIG. 1 will be described again.

The event data generated by the event encoder 5 and the statistical information generated by the statistical processing unit 6 are output to the output unit 7.

The output unit 7 stores the event data and the statistical information in a payload area in a predetermined data format and transmits the event data and the statistical information. The minimum unit of data transmitted by the output unit 7 is described as "minimum unit data".

The output unit 7 irregularly transmits the minimum unit data in which some pieces of event data are stored in the payload area, and transmits the minimum unit data in which the statistical information is stored in the payload area every time a predetermined time elapses.

Figure 3:
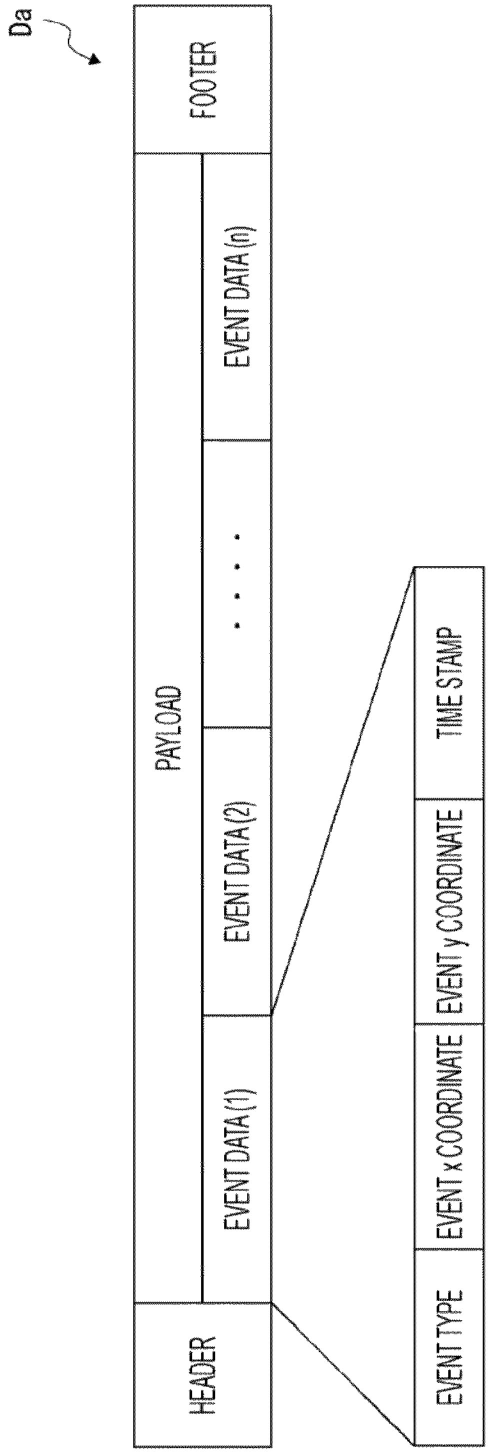
FIG. 3 is a diagram illustrating an example of minimum unit data including event data.
Figure 4:
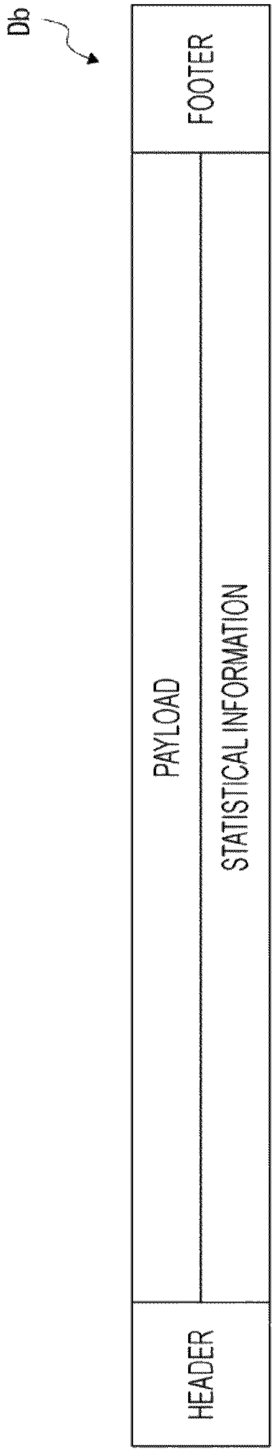
FIG. 4 is a diagram illustrating an example of minimum unit data including statistical information.

FIG. 3 illustrates an example of minimum unit data Da including the event data, and FIG. 4 illustrates an example of minimum unit data Db including the statistical information.

The minimum unit data Da illustrated in FIG. 3 includes a header area, a footer area, and a payload area, and n pieces of event data are stored in the payload area.

One piece of event data includes event type (whether it is an ON event or an OFF event) information, information regarding an x coordinate and a y coordinate of a pixel where the event is detected, and time stamp information for specifying a time when the event is detected.

The minimum unit data Db illustrated in FIG. 4 includes a header area, a footer area, and a payload area, which are similar to those of the minimum unit data Da, and the statistical information is stored in the payload area.

The minimum unit data Db is data transmitted from the output unit 7 every predetermined time. For example, the minimum unit data Db is data transmitted every period of one frame defined as several milliseconds or several tens of milliseconds.

An example of the statistical information stored in the payload area is illustrated in FIG. 5. For example, in a case where the pixel array unit 3 is divided into nine areas from the area Ar1 to the area Ar9 as illustrated in FIG. 2, nine pieces of statistical information in which an area ID and the number of noise events are combined are stored in the payload area.

Specifically, data indicating that the number of noise events generated in the area Ar1 in one frame period is 10, data indicating that the number of noise events generated in the area Ar2 in the period is three, and the like are stored in the payload area (see FIG. 5).

The data as the statistical information stored in the payload area varies depending on whether or not the reception side (the predetermined processing unit 8) of the statistical information obtains the division state of the pixel array unit 3.

Figure 6:
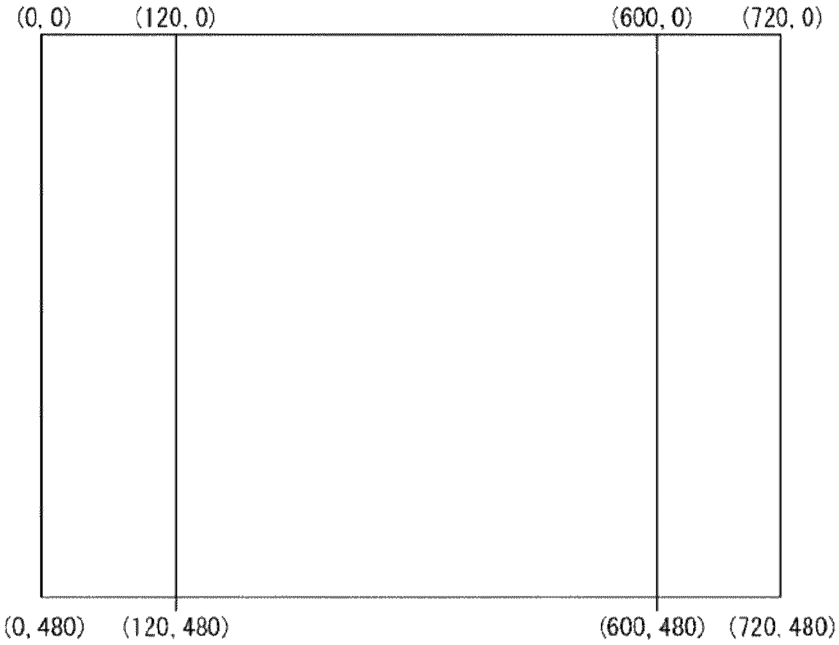
FIG. 6 is a diagram illustrating another division example of a pixel array unit.

For simplicity of explanation, a case where the pixel array unit 3 is divided into three areas Ar1, Ar2, and Ar3 as illustrated in FIG. 6 will be described as an example.

In a case where the predetermined processing unit 8 that receives the minimum unit data Db including the statistical information obtains the division state of the pixel array unit 3, only the number of noise events for each area Ar is only required to be stored in the payload area of the minimum unit data Db. That is, as illustrated in FIG. 7, the number of noise events occurring in the area Ar1 is stored in a data area with a data address "one", the number of noise events occurring in the area Ar2 is stored in a data area with a data address "two", and the number of noise events occurring in the area Ar3 is stored in a data area with a data address "three".

On the other hand, in a case where the predetermined processing unit 8 that receives the minimum unit data Db including the statistical information does not obtain the division state of the pixel array unit 3, information for specifying the position and size of each area Ar is added as the statistical information.

Specifically, as illustrated in FIG. 8, "three", which is the number of divisions of the area, is stored in the data area with the data address "1". Furthermore, in the data areas from the data area with the data address "two" to the data area with the data address "6", information for specifying the position and size of the area Ar1 and the number of noise events occurring in the area Ar1 are stored.

Specifically, the x coordinate of the reference position of the area Ar1 (for example, the upper left pixel position of the area Ar1) is stored in the data area with the data address "two", and the y coordinate thereof is stored in the data area with the data address "three". Then, information regarding the width (number of pixels) of the area Ar1 is stored in the data area with the data address "four", and information regarding the height (number of pixels) of the area Ar1 is stored in the data area with the data address "five". Moreover, the number of noise events occurring in the area Ar1 is stored in the data area with the data address "six".

Similarly, similar information of the area Ar2 is stored in the data areas from the data area with the data address "seven" to the data area with the data address "11", and similar information of the area Ar3 is stored in the data areas from the data area with the data address "12" to the data area with the data address "16".

FIG. 1 will be described again.

The pixel array unit 3, the arbiter 4, the event encoder 5, the statistical processing unit 6, and the output unit 7 constitute a sensing unit 9 that outputs event data as sensing data in a predetermined data format.

The event data and the statistical information, which are output from the sensing unit 9, are output to the DSP 2. The DSP 2 functions as a predetermined processing unit 8 that executes predetermined processing to be a noise source.

Note that the sensing unit 9 and the DSP 2 may be stacked on the same substrate or may be provided on different substrates.

However, in a case where the sensing unit 9 and the DSP 2 are provided to be stacked on the same substrate and are present with a physically close distance, an event generated due to electromagnetic noise generated from the DSP 2 as a noise source is detected in the pixel array unit 3, and thus, the number of noise events tends to increase.

Then, in such a state, by sending the number of noise events to the DSP 2 in the subsequent stage using the statistical information as described above, appropriate processing in consideration of the number of noise events can be performed by the DSP 2, and the effect of reducing the influence of the electromagnetic noise can be remarkably obtained.

The predetermined processing unit 8 is a processing unit that executes processing (predetermined processing) to be a noise source, and the predetermined processing unit 8 executes, for example, processing of specifying a subject captured in an image obtained on the basis of an event signal output from the pixel array unit 3 by performing inference processing using an artificial intelligence (AI) model obtained by machine learning.

The predetermined processing unit 8 calculates the label of the subject and the likelihood thereof in the inference processing. Here, the label is given when the subject is classified, and various kinds of labels such as "person", "automobile", "bicycle", "motorcycle", "traffic light", "dog", "cat", "river", "cloud", and "sun" are conceivable without being limited to living things and objects.

For example, the predetermined processing unit 8 labels the subject imaged in the area Ar1 with "automobile", and sets the likelihood to "80".

Furthermore, the predetermined processing unit 8 performs a correspondence processing on the basis of statistical information regarding the noise event. For example, in a case where the number of noise events occurring in the area Ar1 is large, the possibility that the inference result obtained on the basis of information having much noise is erroneous is somewhat high. Therefore, the likelihood assigned to the subject detected in the area Ar1 together with the label is lowered.

On the other hand, in a case where the number of noise events occurring in the area Ar1 is small, the possibility that the inference result obtained on the basis of information having less noise is correct is somewhat high. Therefore, the likelihood assigned to the subject detected in the area Ar1 together with the label is not lowered. Note that at this time, processing of increasing the likelihood may be performed.

The inference processing executed by the predetermined processing unit 8 is predetermined processing to be a noise source, and can also be said to be correspondence processing executed in accordance with an event signal. Then, the predetermined processing unit 8 adjusts the likelihood of the inference processing as adjustment for obtaining a more appropriate processing result as the processing result of the correspondence processing.

2. Transmission Timing of Minimum Unit Data

Figure 9:
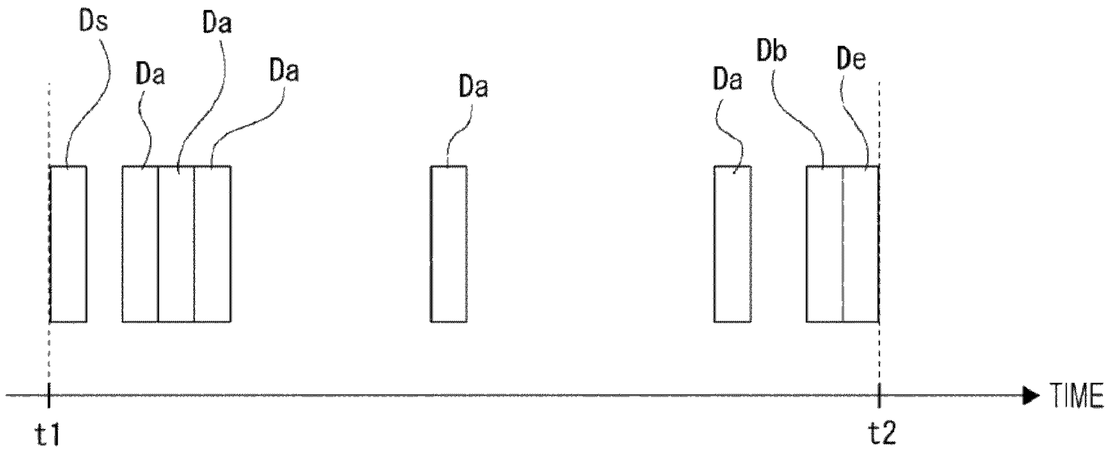
FIG. 9 is an explanatory diagram of a transmission timing of minimum unit data.
Figure 10:
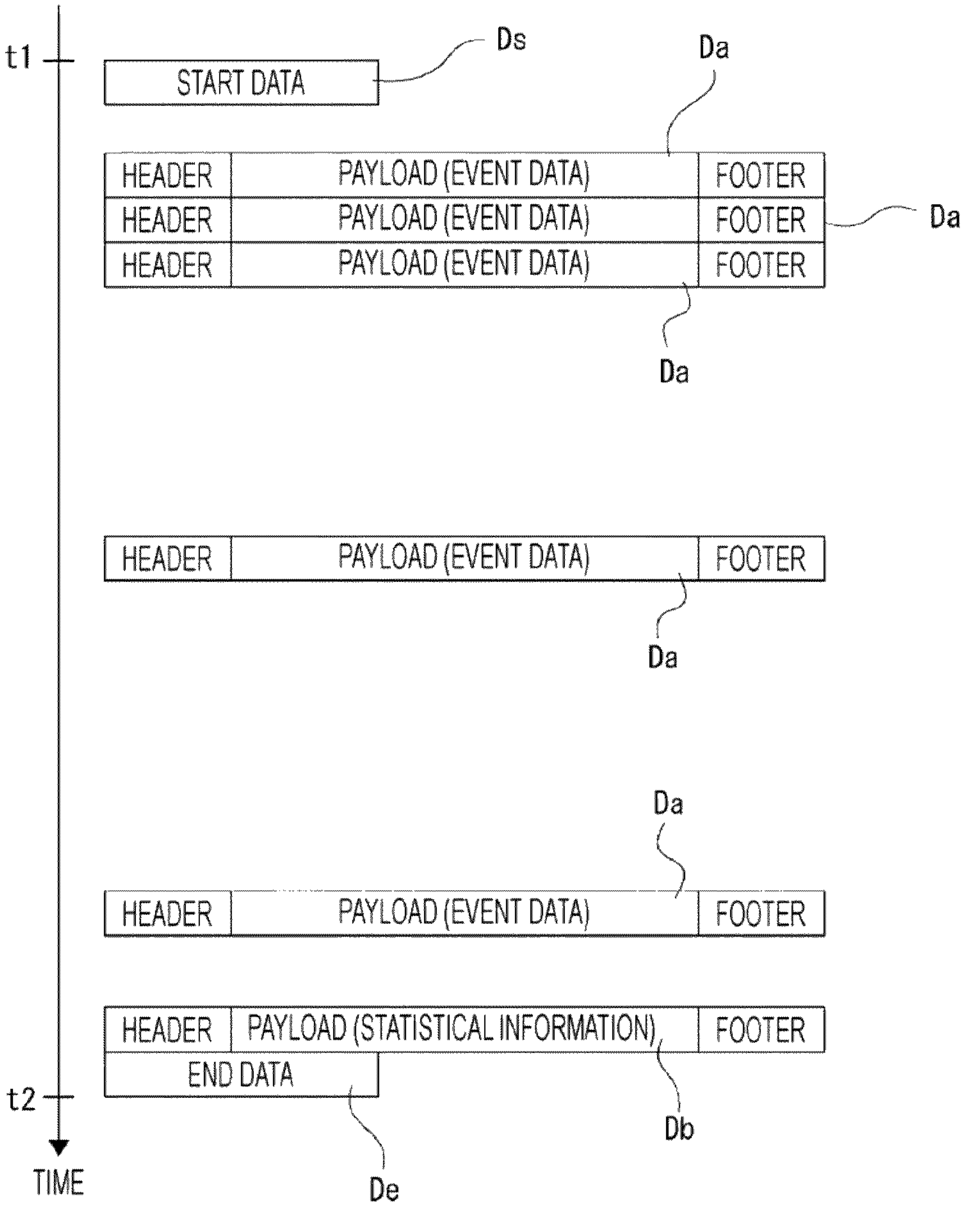
FIG. 10 is a diagram for describing a transmission timing together with a structure of minimum unit data.

FIGS. 9 and 10 illustrate an example of a timing at which the minimum unit data Da and the minimum unit data Db are transmitted from the output unit 7 to the DSP 2 in the subsequent stage.

Note that a horizontal axis in FIG. 9 and a vertical axis in FIG. 10 are time axes. Furthermore, time t1 on the time axis is a start time of a certain frame, and time t2 is an end time of the frame (a start time of the next frame).

First, immediately after time t1 that is the start time of the frame, start data Ds indicating the start of the frame is transmitted from the output unit 7.

Thereafter, every time a predetermined number (n in the example of FIG. 3) of events are detected in the pixel array unit 3, the minimum unit data Da in which the event data is stored in the payload area is transmitted from the output unit 7. Then, a period in which data is not transmitted continues until an event is detected. Furthermore, in a case where many events are detected, a plurality of pieces of minimum unit data Da is continuously transmitted.

Just before time t2 which is the end time of the frame, the minimum unit data Db in which the statistical information obtained by counting the number of noise events in the events occurring during the frame period is stored in the payload area is transmitted from the output unit 7.

Then, at time t2, end data De indicating the end of the frame is transmitted from the output unit 7.

Note that the end data De may be substituted with the start data Ds in the next frame.

3. Processing Flow

A flow of processing executed by the sensing unit 9 will be described with reference to FIG. 11.

First, when the pixel array unit 3 is divided into predetermined areas, the sensing unit 9 stores area division setting information in step S101.

Next, in step S102, the sensing unit 9 starts image capturing (imaging). The start of the imaging is performed, for example, according to an operation of the user.

In step S103, the statistical processing unit 6 of the sensing unit 9 performs processing of clearing the noise event counter.

In step S104, the statistical processing unit 6 of the sensing unit 9 determines whether or not an event (ON event and OFF event) occurs. In a case where it is determined that the event does not occur, the statistical processing unit 6 returns to the processing of step S104 again.

On the other hand, in a case where it is determined that the event occurs, the event encoder 5 of the sensing unit 9 performs processing of generating event data on the basis of the event signal in step S105. The generated event data is transmitted to the output unit 7.

Subsequently, in step S106, the statistical processing unit 6 of the sensing unit 9 determines whether or not the predetermined processing unit 8 as a noise source is being driven on the basis of the Enable signal.

In a case where it is determined that the predetermined processing unit 8 is being driven, that is, in a case where it is determined that an event occurs during the driving of the predetermined processing unit 8, the statistical processing unit 6 of the sensing unit 9 specifies the area Ar where the event occurs in step S107. For the specification, information regarding the x coordinate and the y coordinate of the event signal output from the pixel array unit 3 is used.

In step S108, the statistical processing unit 6 of the sensing unit 9 performs processing of adding one to the noise event counter of the specified area Ar.

Subsequent to step S108 in a case where the occurrence event is a noise event, and subsequent to step S105 in a case where the occurrence event is not a noise event (No in step S105), in step S109, the output unit 7 of the sensing unit 9 determines whether or not a predetermined number (n in the example of FIG. 3) of pieces of event data are accumulated.

In a case where it is determined that the predetermined number of pieces of event data are not accumulated, the sensing unit 9 returns to step S104 and waits until an event occurs.

Furthermore, in a case where it is determined that the predetermined number of pieces of event data are accumulated, that is, in a case where it is determined that it is possible to generate the minimum unit data Da in which a predetermined number of pieces of event data are stored in the payload area, the output unit 7 of the sensing unit 9 transmits the minimum unit data Da to the DSP 2 in step S110.

Subsequently, the statistical processing unit 6 of the sensing unit 9 determines in step S111 whether or not a predetermined time has elapsed, that is, whether or not one frame period ends.

In a case where it is determined that one frame period does not end, the sensing unit 9 returns to step S104 and waits until an event occurs.

On the other hand, in a case where it is determined that one frame period ends, the statistical processing unit 6 of the sensing unit 9 provides the statistical information to the output unit 7. In response to this, in step S112, the output unit 7 transmits the minimum unit data Db in which the statistical information is stored in the payload area to the DSP 2.

Figure 11:
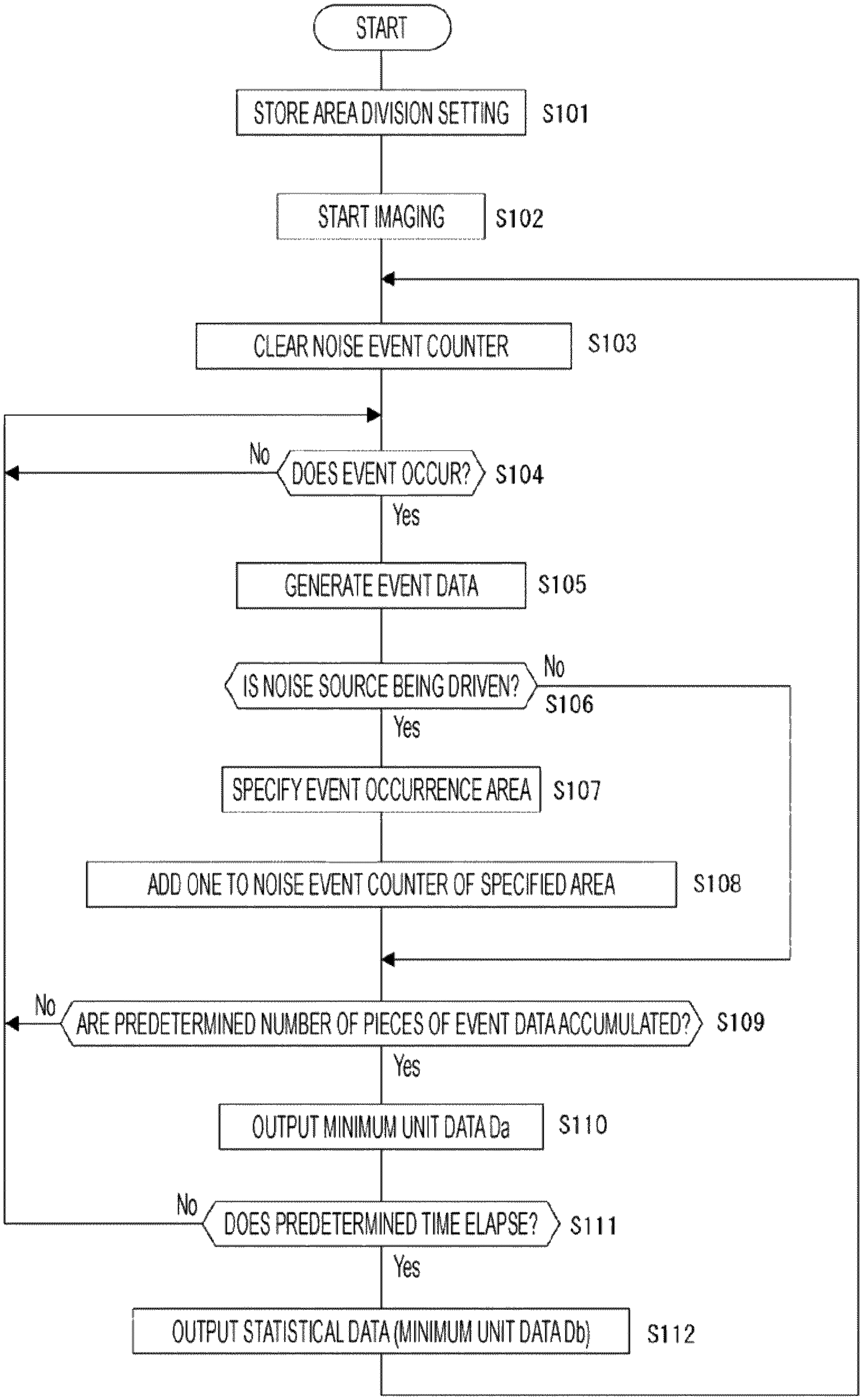
FIG. 11 is a flowchart illustrating an example of processing executed by a sensing unit.

Note that, although not illustrated in FIG. 11, in a case where one frame period ends in a state where the accumulation of the event data does not satisfy a predetermined number, the minimum unit data Da may be transmitted to the DSP 2 in a state where only a number of pieces of event data smaller than a predetermined number is stored in the payload area. Furthermore, at that time, the remaining area of the payload area may be padded with zero or one to be made to have the same size as the other minimum unit data Db and transmitted, or the minimum unit data Da in a state where the data amount of the payload area is small may be transmitted without performing padding.

4. Second Embodiment

A second embodiment is different from the first embodiment in a timing at which the statistical information is transmitted from the output unit 7.

Specifically, in the present embodiment, minimum unit data Dc in which the statistical information is stored in the payload area together with the event data is transmitted from the output unit 7 to the DSP 2 in the subsequent stage.

Figure 12:
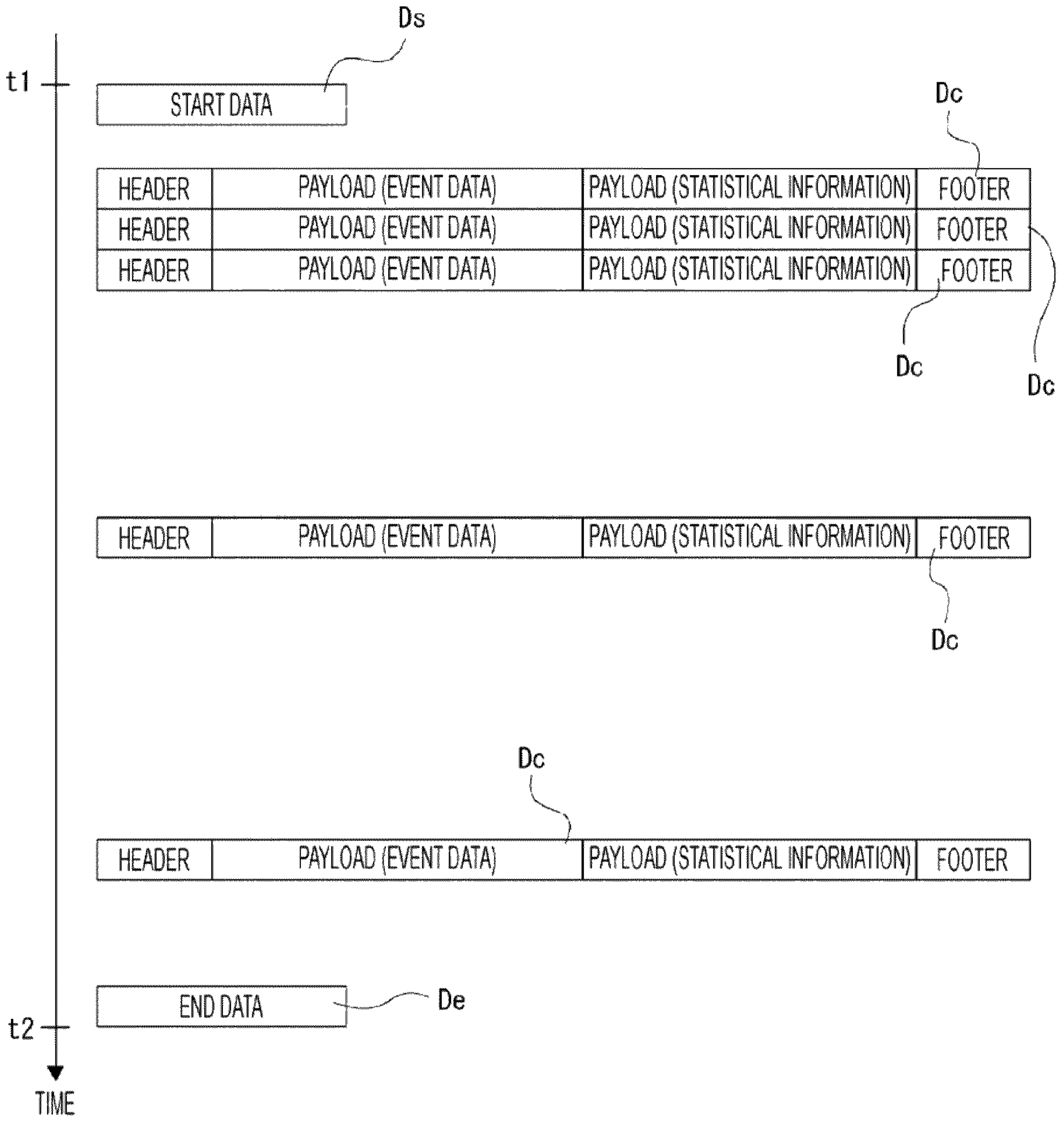
FIG. 12 is a diagram for describing a transmission timing together with a structure of minimum unit data according to a second embodiment.

This will be specifically described with reference to FIG. 12.

First, immediately after time t1 that is the start time of the frame, start data Ds indicating the start of the frame is transmitted from the output unit 7.

Thereafter, every time a predetermined number (for example, m) of events are detected in the pixel array unit 3, the minimum unit data Dc in which both a predetermined number of pieces of the event data and the statistical information are stored in the payload area is transmitted from the output unit 7.

As described above, since the statistical information is added at the time of transmitting the event data, it is not necessary to transmit the minimum unit data Db in which only the statistical information is stored in the payload area from the output unit 7 at the end of the frame.

Note that the statistical information included in the minimum unit data Dc is information indicating the number of noise events among m pieces of event data and the distribution thereof when the number of pieces of event data stored in the payload area is m.

Figure 13:
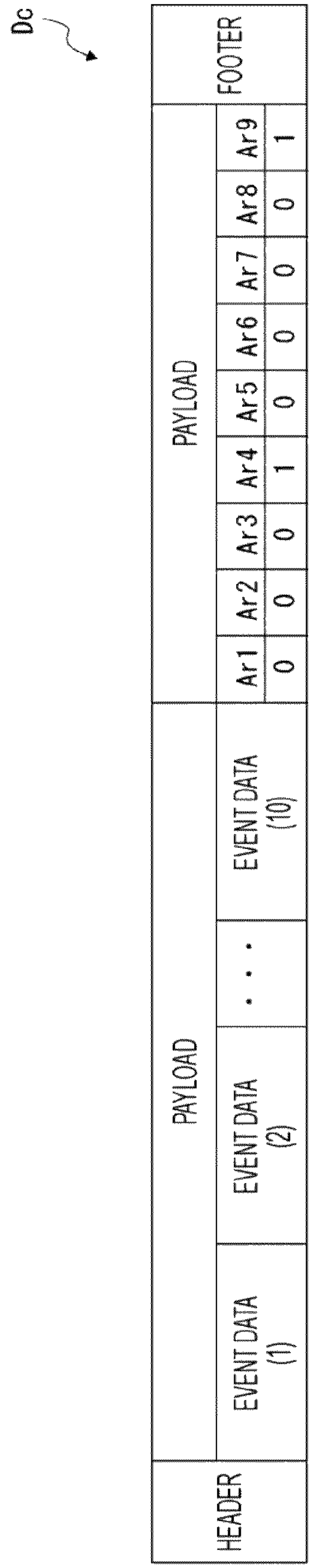
FIG. 13 is a diagram for describing a structure of minimum unit data according to the second embodiment.

For example, FIG. 13 illustrates an example of a case where the pixel array unit 3 is divided into areas Ar1 to Ar9, and the number of pieces of event data included in the minimum unit data Dc is 10.

In the example illustrated in FIG. 13, it can be seen that two pieces of event data among 10 pieces of event data included in the minimum unit data Dc relate to a noise event, and the two noise events occur one by one in each of the area Ar4 and the area Ar9.

Note that each piece of event data may include a flag for identifying whether or not the event data relates to a noise event. That is, the event data may include a type of event for identifying an ON event and an OFF event, information (x coordinate and y coordinate) for specifying the position of the pixel where the event occurs, time stamp information for specifying a time when the event occurs, and flag information for specifying whether or not the event is a noise event.

Figure 14:
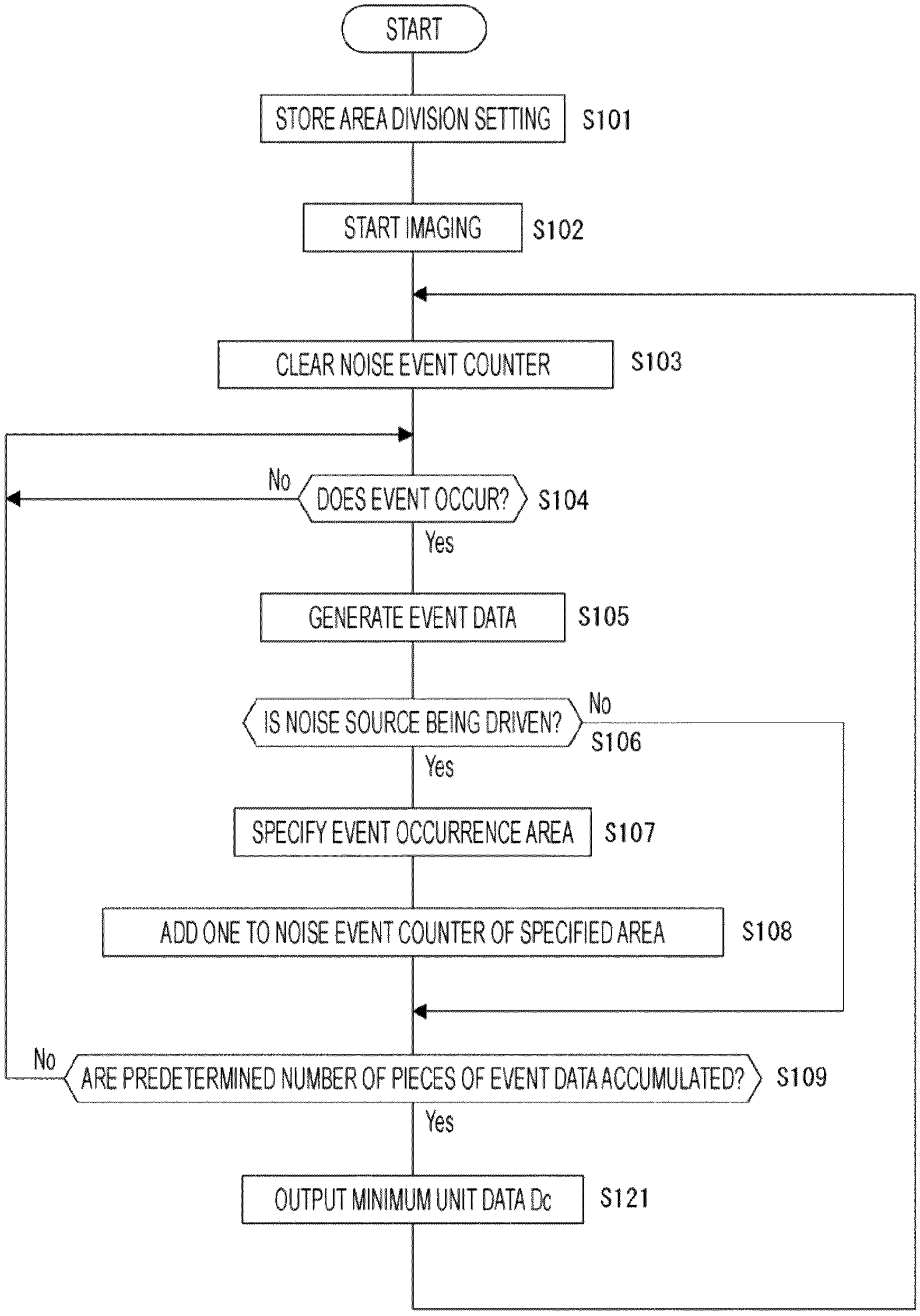
FIG. 14 is a flowchart illustrating an example of processing according to the second embodiment.

A flow of the processing in the second embodiment will be described with reference to FIG. 14.

Note that processing similar to the processing in FIG. 11 described in the first embodiment is denoted by the same step number.

First, when the pixel array unit 3 is divided into predetermined areas, the sensing unit 9 stores area division setting information in step S101.

Next, in step S102, the sensing unit 9 starts image capturing (imaging). The start of the imaging is performed, for example, according to an operation of the user.

In step S103, the statistical processing unit 6 of the sensing unit 9 performs processing of clearing the noise event counter.

In step S104, the statistical processing unit 6 of the sensing unit 9 determines whether or not an event (ON event and OFF event) occurs. In a case where it is determined that the event does not occur, the statistical processing unit 6 returns to the processing of step S104 again.

On the other hand, in a case where it is determined that the event occurs, the event encoder 5 of the sensing unit 9 performs processing of generating event data on the basis of the event signal in step S105. The generated event data is transmitted to the output unit 7.

Subsequently, in step S106, the statistical processing unit 6 of the sensing unit 9 determines whether or not the predetermined processing unit 8 as a noise source is being driven on the basis of the Enable signal.

In a case where it is determined that the predetermined processing unit 8 is being driven, that is, in a case where it is determined that an event occurs during the driving of the predetermined processing unit 8, the statistical processing unit 6 of the sensing unit 9 specifies the area Ar where the event occurs in step S107. For the specification, information regarding the x coordinate and the y coordinate of the event signal output from the pixel array unit 3 is used.

In step S108, the statistical processing unit 6 of the sensing unit 9 performs processing of adding one to the noise event counter of the specified area Ar.

Subsequent to step S108 in a case where the occurrence event is a noise event, and subsequent to step S105 in a case where the occurrence event is not a noise event (No in step S105), in step S109, the output unit 7 of the sensing unit 9 determines whether or not a predetermined number (for example, m) of pieces of event data are accumulated.

In a case where it is determined that the predetermined number of pieces of event data are not accumulated, the sensing unit 9 returns to step S104 and waits until an event occurs.

Furthermore, in a case where it is determined that the predetermined number of pieces of event data are accumulated, that is, in a case where it is determined that it is possible to generate the minimum unit data Dc in which a predetermined number of pieces of event data are stored in the payload area, the output unit 7 of the sensing unit 9 generates the minimum unit data Dc in which both of the predetermined number of pieces of event data and the statistical information are stored in the payload area and transmits the minimum unit data Dc to the DSP 2 in step S121.

After transmitting the minimum unit data Dc, the sensing unit 9 returns to step S103 and clears the noise event counter.

As described above, by transmitting the statistical information for each minimum unit data Dc instead of transmitting the statistical information collectively for each frame period to the processing unit in the subsequent stage (predetermined processing unit 8), it is possible to perform various adjustment processing using the statistical information without waiting for the end of the frame period.

5. Third Embodiment

Unlike the first and second embodiments, a third embodiment is an example in which the predetermined processing unit 8 as a noise source is a memory controller 10.

Figure 15:
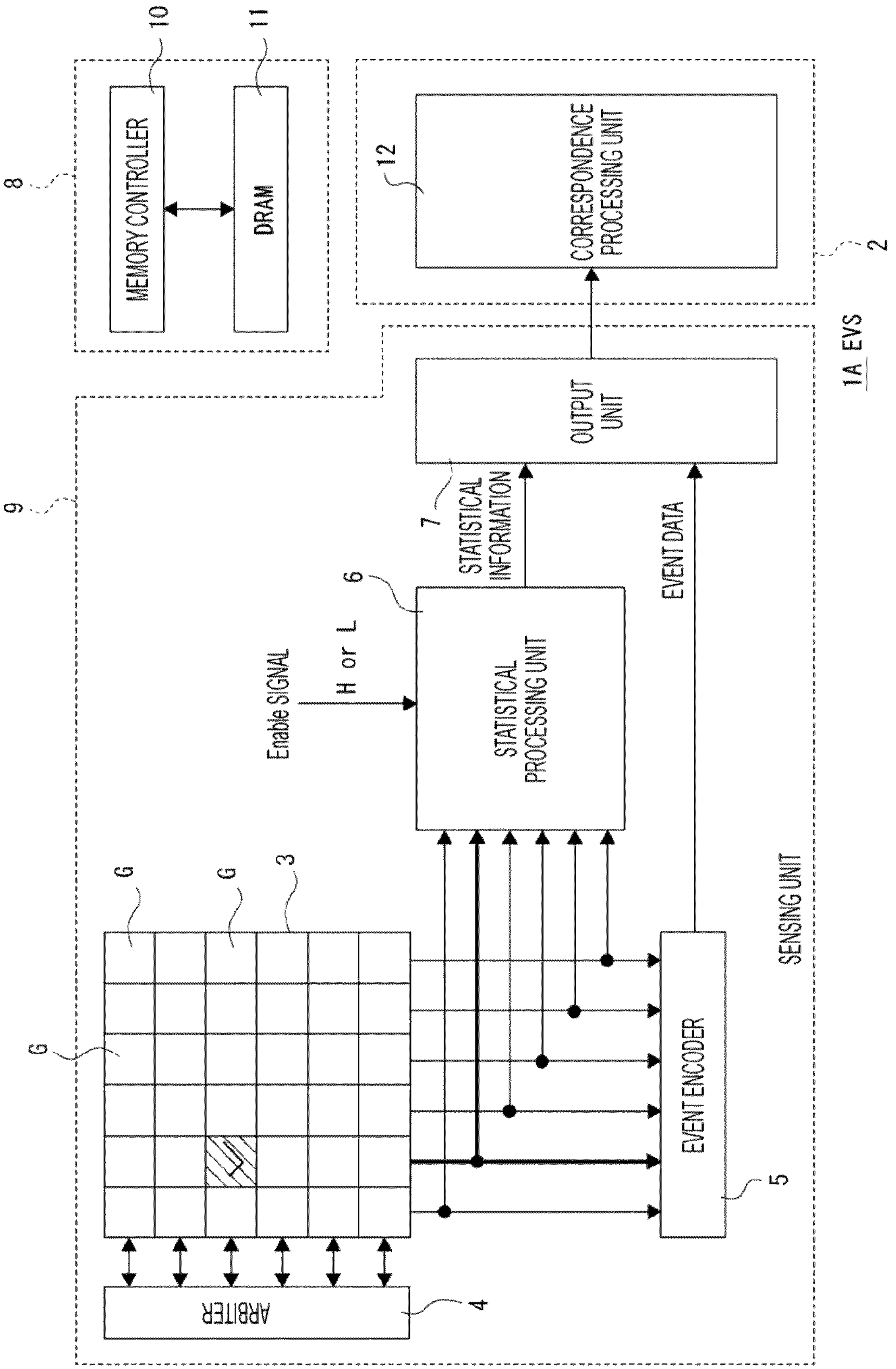
FIG. 15 is a block diagram illustrating a configuration example of EVS according to a third embodiment.

Specifically, as illustrated in FIG. 15, an EVS 1A includes a pixel array unit 3, an arbiter 4, an event encoder 5, a statistical processing unit 6, an output unit 7, a memory controller 10, a dynamic random access memory (DRAM) 11, and a correspondence processing unit 12.

Since the pixel array unit 3, the arbiter 4, the event encoder 5, and the output unit 7 have the same configurations as those of the first embodiment, the description thereof will be omitted.

The statistical processing unit 6 calculates and outputs statistical information regarding the number of events that occur during driving of the noise source among the occurrence events.

Here, unlike the first and second embodiments, electromagnetic noise is generated by refresh processing of the DRAM 11 through the memory controller 10. That is, the memory controller 10 and the DRAM 11 constitutes the predetermined processing unit 8 that executes predetermined processing in which the electromagnetic noise is generated.

The refresh processing is processing of periodically replenishing charge such that the information stored in the DRAM 11 does not disappear. It is undeniable that the event occurring during the execution of this processing is an event detected due to the influence of electromagnetic noise. Therefore, such an event is treated as a noise event.

For example, the memory controller 10 and the DRAM 11 are used for the purpose of temporarily storing event data. By temporarily storing the event data in the DRAM 11, even in a case where the number of events occurring per unit time is large and the transmission of the event data is not in time, missing of the event data can be prevented.

Note that the Enable signal used by the statistical processing unit 6 in the processing of determining whether or not the noise source is driven during the occurrence of the event is a signal that is turned on when the refresh processing is executed and turned off when the refresh processing is not executed.

The correspondence processing unit 12 included in the DSP 2 performs noise reduction processing on the basis of the event data and statistical information stored in the minimum unit data Da and the minimum unit data Db (or the minimum unit data Dc) which are output from the output unit 7.

Furthermore, the correspondence processing unit 12 adjusts the intensity of the noise reduction on the basis of the statistical information as adjustment of the correspondence processing.

For example, in a case where the area Ar2 has more noise events than the area Ar1, the correspondence processing unit 12 increases the intensity of the noise reduction processing on the area Ar2 rather than the intensity of the noise reduction processing on the area Ar1.

Note that, at this time, the intensity of the noise reduction may be adjusted according to the number of noise events for each area Ar, but the intensity of the noise reduction may be adjusted on the basis of statistical information normalized to the number of noise events per predetermined number of pixels.

By using the normalized statistical information, it is possible to perform more appropriate correspondence processing (processing of adjusting the intensity of noise reduction).

6. Modification Example

In FIG. 5, the example has been described in which only the number of noise events for each area Ar is stored as the statistical information stored in the payload area of the minimum unit data Db and the payload area of the minimum unit data Dc, but other examples are also conceivable.

For example, as illustrated in FIG. 16, in addition to the number of noise events for each area Ar, the total number of noise events detected in all the areas may be stored in the payload area of the minimum unit data Db and the payload area of the minimum unit data Dc. This is suitable in a case where adjustment of the correspondence processing is performed using the total number of noise events.

Furthermore, another example is illustrated in FIG. 17. In the example of FIG. 17, not only the number of noise events but also the difference (variation) from the previous frame and the integration of the noise events of the past two frames may be stored in the payload area of the minimum unit data Db and the payload area of the minimum unit data Dc for each area Ar.

In the above-described example, the example of integrating the number of noise events for each area Ar including a plurality of pixels G has been described. This is suitable for a case where the correspondence processing is performed for each area Ar, such as a case where the noise reduction processing is performed by changing the intensity for each area Ar.

On the other hand, in a case where the correspondence processing is performed for each pixel G, one area Ar includes only one pixel G and the presence or absence of the occurrence of the noise event may be managed for each pixel G. Thus, in a case where the correspondence processing is performed for each pixel G, the adjustment of the correspondence processing can be suitably performed.

Furthermore, it may be configured such that a user can select how to divide the pixel array unit 3, or a user can select whether or not to divide the pixel array unit 3 into a plurality of areas Ar in the first place.

Note that, in the above-described example, the DSP 2, the memory controller 10, and the DRAM 11 have been described as an example of the noise source, but the present technology can be applied to a case where elements that generate electromagnetic noise are stacked in the EVS 1.

7. Summary

As described in the examples described above, the EVS 1 as an image sensor includes: a pixel array unit 3 in which pixels G are two-dimensionally arranged, the pixels G detecting a change in light reception amount as an event (ON event or OFF event) and generating an event signal indicating a detection result of the event; a predetermined processing unit 8 configured to execute predetermined processing accompanied by generation of electromagnetic noise; and an information output unit (output unit 7) configured to output noise source driving presence/absence data (for example, statistical information regarding a noise event) indicating whether or not the predetermined processing is executed when the event is detected.

There is a possibility that the event occurring during the execution of the predetermined processing of generating the electromagnetic noise is an event erroneously detected due to the electromagnetic noise.

In the case of a normal pixel array unit in which RGB pixels are two-dimensionally arranged, since the reading processing is performed on all the pixels, the position of each of the pixels read during execution of the predetermined processing can be estimated on the basis of a reading timing. However, in an EVS in which the reading processing is performed only on the pixel in which the change in light reception amount occurs, since the reading timing for the event signal is undefined, the position of the pixel from which the event signal is output cannot be estimated on the basis of the reading timing.

Therefore, by generating the noise source driving presence/absence data indicating whether or not the event signal is generated during the execution of the predetermined processing as the noise source, it is possible to estimate the possibility that the event is erroneously detected due to the electromagnetic noise.

Thus, in the EVS 1 in which various processing units are stacked, pieces of statistical information indicating how many events are erroneously detected in which area due to the noise mixed when the DSP 2, the memory controller 10, and the DRAM 11 as the noise sources are operated are collected and transmitted to the subsequent stage, such that the noise reduction processing can be adjusted in a subsequent-stage block using the event data, and the recognition result can be adjusted. That is, it is possible to perform appropriate processing in consideration of the reliability of the event signal in the signal processing block or the like in the subsequent stage.

Note that the data indicating the number of noise events described above is an example of noise source driving presence/absence data.

An example of the above-described data format includes a mobile industry processor interface (MIPI), but application of the present technology is not limited to the MIPI.

Furthermore, in a case where the present technology is implemented using a specified data format, the statistical information described above may be stored in a vendor extension area, a reserve area, or an unused area provided in the specified data format.

As described above, the predetermined processing executed by the predetermined processing unit 8 may be inference processing using a machine learning model.

Thus, for the event signal generated during the execution of the inference processing, information such as a flag indicating that the processing unit (the DSP 2, the memory controller 10, and the DRAM 11) as the noise source is being driven is output as the noise source driving presence/absence data. Therefore, the processing in the subsequent stage can be appropriately performed in consideration of the reliability of the event signal.

As described with reference to FIG. 1 and the like, the EVS 1 may include the digital signal processor (DSP 2), and the inference processing may be processing executed by the digital signal processor.

For the event signal generated during the processing of the digital signal processor, information indicating that the event is detected during driving of the noise source (the DSP 2, the memory controller 10, and the DRAM 11) is output. Therefore, the processing in the subsequent stage can be appropriately performed in consideration of the reliability of the event signal.

As described with reference to FIG. 15 and the like, the predetermined processing executed by the predetermined processing unit 8 may be refresh processing of a semiconductor memory (DRAM 11).

For example, for the event signal generated during the refresh processing of the semiconductor memory such as the DRAM 11, information indicating that the event is detected during driving of the noise source (the memory controller 10 or the DRAM 11) is output. Therefore, the processing in the subsequent stage can be appropriately performed in consideration of the reliability of the event signal.

As described with reference to FIGS. 4, 5, and the like, the information output unit (output unit 7) of the EVS 1 may output the statistical information of the noise source driving presence/absence data.

Thus, it is possible to grasp the distribution of pixels where an event occurs during driving of the noise source (the DSP 2, the memory controller 10, or the DRAM 11) in the processing in the subsequent stage (the processing unit that performs correspondence processing, for example, the predetermined processing unit 8 or the correspondence processing unit 12). Therefore, it is possible to specify an area where events with low reliability occur intensively, and the like, and it is possible to use the area for the processing in the subsequent stage.

As described with reference to FIGS. 4, 5, and the like, the information output unit (output unit 7) of the EVS 1 may output statistical information for each predetermined area (area Ar) divided in the pixel array unit 3.

Thus, in a case where the processing unit (the processing unit that performs correspondence processing, for example, the predetermined processing unit 8 or the correspondence processing unit 12) in the subsequent stage performs the processing for each predetermined area Ar of the pixel array unit 3, the processing unit in the subsequent stage can suitably perform the processing in consideration of the reliability of the event signal.

As described with reference to FIG. 8 and the like, the statistical information regarding the noise event may include information for specifying a predetermined area (area Ar).

Even in a case where the region division scheme in the pixel array unit 3 is not shared by the processing unit in the subsequent stage (the processing unit that performs correspondence processing, for example, the predetermined processing unit 8 or the correspondence processing unit 12), it is possible to suitably perform the processing in the subsequent stage in consideration of the reliability of the event signal.

As described with reference to FIGS. 12, 13, 14, and the like, the information output unit (output unit 7) of the EVS 1 may output the statistical information for each transmission data unit (minimum unit data Dc) in a data format used for the transmission of the event signal.

In a case where the processing unit (such as the DSP 2) in the subsequent stage performs processing for each minimum transmission data unit in the data format, the processing can be performed on the basis of the statistical information.

As described with reference to FIG. 4 and the like, the information output unit (output unit 7) of the EVS 1 may output the statistical information every predetermined time (for example, one frame period).

For example, in a case where the processing unit in the subsequent stage (the predetermined processing unit 8 or the correspondence processing unit 12 that performs the correspondence processing) performs processing for each frame, the event signal generated within the period of one frame and the reliability of the event signal can be obtained as the statistical information, which is preferable.

As described above, the data structure used in the present technology is a data structure used in a signal processing device (an EVS 1 or a device used in the subsequent stage of the EVS 1) that includes a pixel array unit 3 in which pixels G are two-dimensionally arranged, the pixels G detecting a change in light reception amount as an event (ON event or OFF event) and generating an event signal indicating a detection result of the event, and a predetermined processing unit 8 configured to execute predetermined processing accompanied by generation of electromagnetic noise, the signal processing device performing signal processing using the event signal obtained in an image sensor (EVS 1) that generates noise source driving presence/absence data (for example, statistical information regarding the noise event) indicating whether or not the predetermined processing is executed when the event is detected, and the data structure includes the event signal and the noise source driving presence/absence data, and is used by the signal processing device to perform correspondence processing using the event signal and adjust the correspondence processing on the basis of the noise source driving presence/absence data.

By using the data structure defined so as to include the noise source driving presence/absence data, it is possible to estimate the possibility of the event erroneously detected due to the electromagnetic noise. Therefore, the processing unit in the subsequent stage can perform appropriate processing in consideration of the reliability of the event.

As described above, the predetermined processing executed by the predetermined processing unit 8 may be the correspondence processing and the inference processing using the machine learning model, and the adjustment for the correspondence processing may be adjustment for likelihood information calculated as an inference result of the inference processing.

For example, in a case where inference processing for labeling the subject is performed on the basis of an event signal generated during driving of the noise source, there is a possibility that an erroneous inference result is derived on the basis of the event signal detected erroneously.

According to the present configuration, the likelihood information calculated as the inference result is adjusted according to whether or not the noise source is driven when the event is detected. Specifically, in the inference result obtained on the basis of the event detected during the driving of the noise source, the likelihood information is lowered.

Thus, an appropriate inference result using the reliability of the event signal can be obtained.

As described with reference to FIG. 15 and the like, the correspondence processing may be the noise reduction processing, and the adjustment for the correspondence processing may be adjustment for the intensity of the noise reduction processing.

For example, in the noise reduction processing, it is preferable to change the intensity of the processing according to the amount of noise. According to the present configuration, it is possible to appropriately estimate whether or not the event signal includes noise on the basis of the noise source driving presence/absence data (for example, statistical information regarding a noise event), and thus, it is possible to perform the noise reduction processing with appropriate intensity.

Note that the effects described in the present description are merely examples and are not limited, and other effects may be provided.

Furthermore, the above-described examples may be combined in any way, and the above-described various functions and effects may be obtained even in a case where various combinations are used.

8. Present Technology

Note that the present technology can also adopt the following configurations.

(1)

An image sensor including:

a pixel array unit in which pixels are two-dimensionally arranged, the pixels detecting a change in light reception amount as an event and generating an event signal indicating a detection result of the event;

a predetermined processing unit configured to execute predetermined processing accompanied by generation of electromagnetic noise; and an information output unit configured to output noise source driving presence/absence data indicating whether or not the predetermined processing is executed when the event is detected.

(2)

The image sensor according to (1), in which the predetermined processing is inference processing using a machine learning model.

(3)

The image sensor according to (2), further including a digital signal processor, in which the inference processing is processing executed by the digital signal processor.

(4)

The image sensor according to (1), in which the predetermined processing is refresh processing of a semiconductor memory.

(5)

The image sensor according to any one of (1) to (4), in which the information output unit outputs statistical information of the noise source driving presence/absence data.

(6)

The image sensor according to (5), in which the information output unit outputs the statistical information for each predetermined area divided in the pixel array unit.

(7)

The image sensor according to (6), in which the statistical information includes information for specifying the predetermined area.

(8)

The image sensor according to any one of (5) to (7), in which the information output unit outputs the statistical information for each transmission data unit in a data format used for transmission of the event signal.

(9)

The image sensor according to any one of (5) to (7), in which the information output unit outputs the statistical information every predetermined time.

(10)

A data structure used in a signal processing device that includes a pixel array unit in which pixels are two-dimensionally arranged, the pixels detecting a change in light reception amount as an event and generating an event signal indicating a detection result of the event, and a predetermined processing unit configured to execute predetermined processing accompanied by generation of electromagnetic noise, the signal processing device performing signal processing using the event signal obtained in an image sensor configured to generate noise source driving presence/absence data indicating whether or not the predetermined processing is executed when the event is detected, the data structure including the event signal and the noise source driving presence/absence data, and being used by the signal processing device to perform correspondence processing using the event signal and adjust the correspondence processing on the basis of the noise source driving presence/absence data.

(11)

The data structure according to (10), in which the predetermined processing is the correspondence processing and inference processing using a machine learning model, and the adjustment for the correspondence processing is adjustment for likelihood information calculated as an inference result of the inference processing.

(12)

The data structure according to (10), in which the correspondence processing is noise reduction processing, and the adjustment for the correspondence processing is adjustment for intensity of the noise reduction processing.

REFERENCE SIGNS LIST

1, 1A EVS (Image sensor)
2 Digital signal processor (DSP)
3 Pixel array unit
7 Output unit (Information output unit)
8 Predetermined processing unit
10 Memory controller (Predetermined processing unit)
11 DRAM (Predetermined processing unit)
G Pixel
Da, Db, Dc Minimum unit data (Transmission data unit)

The invention claimed is:

1. An image sensor comprising:

a pixel array unit in which pixels are two-dimensionally arranged, the pixels detecting a change in light reception amount as an event and generating an event signal indicating a detection result of the event;

a predetermined processing unit configured to execute predetermined processing accompanied by generation of electromagnetic noise; and an information output unit configured to output noise source driving presence/absence data indicating whether or not the predetermined processing is executed when the event is detected.

2. The image sensor according to claim 1, wherein the predetermined processing is inference processing using a machine learning model.

3. The image sensor according to claim 2, further comprising a digital signal processor, wherein the inference processing is processing executed by the digital signal processor.

4. The image sensor according to claim 1, wherein the predetermined processing is refresh processing of a semiconductor memory.

5. The image sensor according to claim 1, wherein the information output unit outputs statistical information of the noise source driving presence/absence data.

6. The image sensor according to claim 5, wherein the information output unit outputs the statistical information for each predetermined area divided in the pixel array unit.

7. The image sensor according to claim 6, wherein the statistical information includes information for specifying the predetermined area.

8. The image sensor according to claim 5, wherein the information output unit outputs the statistical information for each transmission data unit in a data format used for transmission of the event signal.

9. The image sensor according to claim 5, wherein the information output unit outputs the statistical information every predetermined time.

10. A data structure used in a signal processing device that includes a pixel array unit in which pixels are two-dimensionally arranged, the pixels detecting a change in light reception amount as an event and generating an event signal indicating a detection result of the event, and a predetermined processing unit configured to execute predetermined processing accompanied by generation of electromagnetic noise, the signal processing device performing signal processing using the event signal obtained in an image sensor configured to generate noise source driving presence/absence data indicating whether or not the predetermined processing is executed when the event is detected, the data structure comprising the event signal and the noise source driving presence/absence data, and being used by the signal processing device to perform correspondence processing using the event signal and adjust the correspondence processing on a basis of the noise source driving presence/absence data.

11. The data structure according to claim 10, wherein the predetermined processing is the correspondence processing and inference processing using a machine learning model, and the adjustment for the correspondence processing is adjustment for likelihood information calculated as an inference result of the inference processing.

12. The data structure according to claim 10, wherein the correspondence processing is noise reduction processing, and the adjustment for the correspondence processing is adjustment for intensity of the noise reduction processing.

* * * * *